United States Patent [19]

Deering

[11] Patent Number: 4,901,064
[45] Date of Patent: Feb. 13, 1990

[54] NORMAL VECTOR SHADING FOR 3-D GRAPHICS DISPLAY SYSTEM

[75] Inventor: Michael F. Deering, Los Altos, Calif.

[73] Assignee: Schlumberger Technologies, Inc., San Jose, Calif.

[21] Appl. No.: 117,162

[22] Filed: Nov. 4, 1987

[51] Int. Cl.⁴ .............................................. G09G 1/00
[52] U.S. Cl. .................................... 340/729; 340/703; 340/744; 364/522
[58] Field of Search ............... 340/701, 703, 729, 744, 340/747; 364/522

[56] References Cited

U.S. PATENT DOCUMENTS

| | | |
|---|---|---|
| 3,684,876 | 8/1972 | Sutherland . |
| 3,732,557 | 5/1973 | Evans et al. . |
| 3,763,365 | 10/1973 | Seitz . |
| 3,816,726 | 6/1974 | Sutherland et al. . |
| 3,889,107 | 6/1975 | Sutherland . |
| 4,283,765 | 8/1981 | Rieger . |
| 4,291,380 | 9/1981 | Rohner . |
| 4,343,037 | 8/1982 | Bolton . |
| 4,371,872 | 2/1983 | Rossman . |
| 4,380,046 | 4/1983 | Fung . |
| 4,412,296 | 10/1983 | Taylor . |
| 4,458,330 | 7/1984 | Imsand et al. . |
| 4,492,956 | 1/1985 | Collmeyer et al. . |
| 4,550,315 | 10/1985 | Bass et al. . |
| 4,570,181 | 2/1986 | Yamamura . |
| 4,570,233 | 2/1986 | Yan et al. . |
| 4,586,038 | 4/1986 | Sims et al. . |
| 4,646,075 | 2/1987 | Andrews et al. ................... 340/747 |
| 4,658,247 | 4/1987 | Gharachorloo ..................... 340/747 |
| 4,697,178 | 9/1987 | Heckel . |
| 4,709,231 | 11/1987 | Sakaibara et al. ................... 340/729 |
| 4,730,261 | 3/1988 | Smith ................................. 340/729 |
| 4,736,200 | 4/1988 | Oununa . |
| 4,737,921 | 4/1988 | Goldwasser et al. . |

FOREIGN PATENT DOCUMENTS

| | | |
|---|---|---|
| 0137233A2 | 8/1984 | European Pat. Off. . |
| 0168981A2 | 6/1985 | European Pat. Off. . |
| 0167165A2 | 7/1985 | European Pat. Off. . |
| 84/01153 | 7/1984 | PCT Int'l Appl. . |
| 84/01705 | 10/1984 | PCT Int'l Appl. . |

OTHER PUBLICATIONS

"Reentrant Polygon Clipping", Sutherland & Hodgman, Communications of the ACM, Jan. 1974, vol. 17, pp. 32–47.

"An Analysis and Algorithm for Polygon Clipping", Liang & Barsky, Research Contributions, Robert Haralick, Editor, 1983 ACM.

"A VLSI Approach to Computer Image Generation", Cohen & Demetrescu, presented at the First Interservice/Industry Training Equipment Conference, Orlando, Florida, Nov. 28, 1979.

"High Speed Image Rasterization Using Scan Line Access Memories", Demetrescu, 1985 Chapel Hill Conference on Very Large Scale Integration 35 (H. Fuchs ed, 1985), pp. 221–243.

"Super Buffer: A Systolic VLSI Graphics Engine for Real Time Raster Image Generation", Gharachorloo & Pottle, 1985 Chapel Hill Conference on Very Large Scale Integration 35 (H. Fuchs ed, 1985), pp. 285–305.

"Pixel–Planes: Building a VLSI–Based Graphics System", Foulton et al., 1985 Chapel Hill Conference on Very Large Scale Integration 35 (H. Fuchs ed, 1985), pp. 35–61.

Primary Examiner—David K. Moore
Assistant Examiner—Jeffery A. Brier
Attorney, Agent, or Firm—David H. Carroll; Robert C. Colwell; Paul C. Haughey

[57] ABSTRACT

A system is provided for application of a lighting model to a rasterized stream of pixels. The system typically includes a series of circuits, each for applying a lighting model to a single pixel. Each chip typically includes some memory sources for storing the lighting model, an input section connected to receive data indicative of the normal vector, Z depth, and material characteristics of the object represented by the pixel to be colored. A special purpose processor connected to the input then applies the lighting model to the pixel and supplies color value of the pixel as an output signal.

6 Claims, 2 Drawing Sheets

NORMAL VECTOR SHADING FOR 3-D GRAPHICS DISPLAY SYSTEM

BACKGROUND OF THE INVENTION

1. Field of the Invention

This invention relates to graphics display systems, and in particular, to a system for specifying the color and intensity of pixels in an image to be displayed on such systems.

2. Description of the Prior Art

Three-dimensional computer graphics displays are used to display images to a user as if he were observing a real world environment. These systems store in a data base a representation in three-dimensional coordinates of three-dimensional objects, as well as information concerning their color and other properties. Additional "environment" information including the number, color, location, and other properties of illumination sources, atmospheric properties, and many other details also may be specified. The display is generated after being provided with the desired viewing angle for the viewer. In addition, the user may specify the field of view, the size of the image to be produced, and the back plane of the viewing volume so as to include or eliminate background as desired. The system must calculate all the details of the image, including determining which objects obscure others from the viewer's point of view, and present them accordingly.

The image data base in a typical graphics display system stores a description of each object in a scene as a number of small polygons which cover the surface of the object in the same manner that a number of small tiles can cover a wall or other surface. Each polygon is described by a list of its vertex coordinates (X, Y, Z) and a specification of material surface properties (e.g., color, texture, shininess, etc.), as well as possibly the normal vectors to the surface at each vertex. For three-dimensional objects with complex curved surfaces, the polygons in general are triangles or quadrilaterals (which can be decomposed into pairs of triangles).

In such systems a transformation engine transforms the object coordinates in response to the angle of viewing selected by a user. A clipping circuit eliminates the triangles which are outside the viewing area and "clips" the polygons which are partly inside and partly outside the viewing area. The vertices of the resulting polygons are transmitted by the clipping circuit to the next stage in coordinates corresponding to the viewing screen (X, Y coordinates) with an associated depth for each vertex (Z coordinate). In a typical prior art system, a lighting model 20 is applied next to specify the color of each triangle. Then the triangles with their color values are transmitted to a rasterizer.

For each polygon, the rasterizer determines which pixel positions are covered by that triangle and compares the depth values (Z) for the polygon being processed with the depth value of any pixel which already in the frame buffer. If the depth value of the new polygon pixel is smaller, indicating that it is in front of the polygon already written into the frame buffer, then the new value replaces the value in the frame buffer. This process is repeated until all polygons have been rasterized. Then the video controller displays the contents of the frame buffer on a display a scan line at a time in raster order.

A number of systems have been designed to improve upon the above basic system. With recent improvements in floating point processing and polygon fill algorithms, the main bottleneck of the basic system is the amount of time required to rasterize each polygon, compare each pixel generated to the one already stored in the frame buffer, and then write the pixel into the frame buffer. The time required to repeat this process for each pixel of each polygon is substantial.

The basic method is characterized by a single rasterization processor writing pixels one by one into a frame buffer. The improved systems are characterized by employing a large number of processors in parallel in which the individual processors represent pixels in the frame buffer. These systems differ in how the processors are assigned to pixels.

An approach known as the pixel-planes method employs brute force and assigns a processor for every pixel in the display screen. See, for example, Foulton, et al., *Pixel Planes: Building a VLSI-Based Graphics System,* 1985 Chapel Hill Conference on Very Large Scale Integration 35 (H. Fuchs ed., 1985). The edges are two-dimensional polygon descriptions are sent one by one to the pixel processors. The processors determine which side of each edge the pixel they represent is on, and consider themselves inside a particular polygon only if they are on the correct side of all its edges. Next, if the depth information is less than that of any previously stored pixel value, the pixel processors load interpolated depth and color information into their pixel value registers. When all polygons have been processed, the information stored for each pixel is supplied to the display in raster scan order. This system is faster then the basic system because the drawing time for any polygon is constant, regardless of the number of pixels effected by the polygon (the area of the polygon). The disadvantage is that an extremely large number of processors is needed. For instance, a 1000×1000 pixel display would require at least a million processors. This disadvantage is only somewhat mitigated by placing multiple pixel processors on a single chip.

Another system known as the Scan Line Access Memory (SLAM) requires custom storage registers for each pixel in the display, but only contains enough pixel processors for a single scan line. Such a system is described in Demetrescu, *High Speed Image Rasterization Using Scan Line Access Memories,* 1985 Chapel Hill Conference on Very Large Scale Integration 35 (H. Fuchs ed., 1985). External rasterization hardware breaks each polygon into horizontal runs of pixels. Only the start and stop addresses of these runs are entered into the SLAM chips, and the internal one-dimensional array of pixel processors determines which pixels are covered by this run. The results are written into an on-chip memory array, indexed by the y location of the particular run. When all polygons have been processed, internal double buffering allows the information stored at each pixel to be supplied to the display in raster scan order. This system allows large polygons to be rasterized in a time dependent primarily upon their height, not their area. Compared to pixel planes, the smaller number of pixel processors reduces the number of chips needed. Unfortunately, considerable external circuitry must break up polygons into pixel runs, and sequence this data to the SLAM chips. The line-by-line overhead required per polygon reduces the overall speed of the system. Finally, the requirement for on-chip RAM resources for all pixels effected by the local pixel processors requires an exorbitant number of chips for a functional 1000×1000 display.

Another system, the super buffer, also employs a single scan line of pixel processors, but does not require local memory for all the pixels effected by them to be on the same chip. This system is described in Gharachorloo and Pottle, *Super Buffer: A Systolic VLSI Graphics Engine for Real Time Raster Image Generation*, 1985 Chapel Hill Conference on Very Large Scale Integration 35 (H. Fuchs ed., 1985). The previous two systems take input polygons one at a time, rasterizing each one completely before going on to the next. The super buffer requires all the polygons to be displayed to be presorted by the y scan line on which they first appear. Each polygon is broken into runs on a scan line basis and the runs sent to the pipe of pixel processors. All runs for all polygons for a given scan line must be sent before sending any runs for any further scan lines. This requires a buffer of partially rasterized polygons to be kept. This system has the advantage that the time to rasterize a given polygon is dependent only on the height of the polygon, and not its area. It also has the advantage that the number of chips required by the system is considerably fewer than in the other two systems. Unfortunately, however, it shares SLAM's requirement for an off-chip polygon run generator, and adds the requirement for juggling several active polygons at a time within this generator. A further requirement is an off-chip memory subsystem to store and sort by starting Y scan line all the polygons to be displayed.

SUMMARY OF THE INVENTION

This invention provides a high speed technique for coloring pixels in a 3-D graphics display system. Parameters of a lighting model are loaded into a pipeline chips fabricated according to the invention. When rasterized, streams of surface normal pixels are subjected to the lighting model, producing a stream of color values for image pixels is provided as a final output. Each chip fabricated according to the technique of the invention contains all of the hardware necessary to perform a complete shading calculation every 64 clock cycles and initiate a new shading calculation every 16 cycles. By placing 16 chips in series, a pipeline is formed which is capable of applying the lighting model continuously at 20 megaHertz.

In a preferred embodiment the system for determining the color of a plurality of pixels includes a series of memories for storing a lighting model, an input section connected to receive data indicative of at least a normal vector for each of the pixels in turn, and a plurality of interconnected processors connected to the input and to the storage elements, for applying the lighting model to a pixel using the normal vector. The invention also includes a technique for assigning individual pixels to individual processors for application of the lighting model. In the preferred embodiment the system receives the normal vector for each pixel to be shaded, its Z depth, and information about the material characteristics represented by the pixel.

DETAILED DESCRIPTION OF THE PREFERRED EMBODIMENTS

To obtain a realistic display of an object, a perspective projection is generated with hidden surfaces removed, and then shading and color patterns are applied to the visible surfaces. A shading model is used to calculate the intensity of light for each portion of the surface of the displayed object. The intensity calculation for each portion of the object is based upon the optical properties of the surface at that location, its relative position with respect to other surfaces, and its orientation with respect to the light source or sources. One now well known technique for shading objects was developed Phong Bui Tuong. The normal vector shader system of this invention employs Phong shading of colored materials by multiple light sources, which themselves may be colored.

Figure 1:
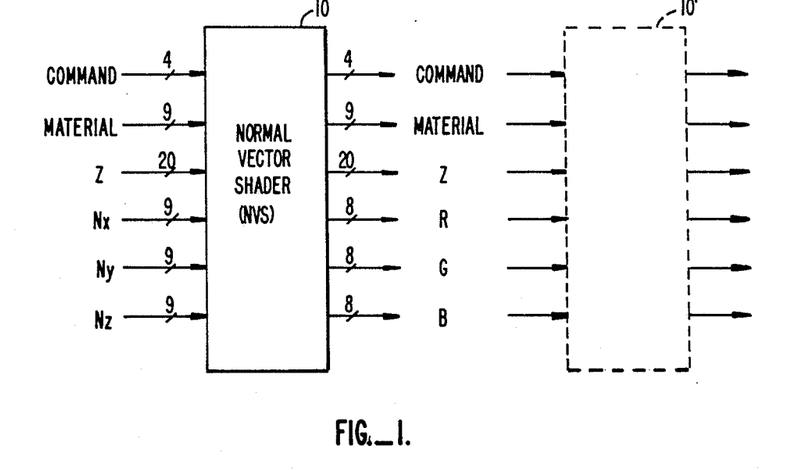
FIG. 1 is a diagram showing the overall functionality of the normal vector shading system of this invention.

FIG. 1 shows the overall functionality of a preferred embodiment of the normal vector shader system (sometimes referred to herein as "NVS system"). This system is intended to be employed in conjunction with U.S. Ser. No. 117,111 filed on 11/4/87, entitled "3D Graphics Display System Using Triangle Processor Pipeline," and U.S. Ser. No. 117,110 filed on 11/4/87, entitled, "Triangle Processor for 3D Graphics Display System." An NVS chip 10, as depicted in FIG. 1, receives data representing surface normal vectors NX, NY and NZ with associated depth Z in the image for that normal vector, together with information about the material properties at that point. Command information is also supplied to the NVS 10. In response, the system passes the command, material, and Z-depth information through unaltered, but supplies complete color information in a red-green-blue system with 8 bits representing the intensity of each of the three colors. Of course, other color systems and digital word lengths may be employed.

A second NVS chip 10′ is also shown in FIG. 1 to illustrate how a series of such chips may be interconnected in a pipeline. In such a pipeline, as will be explained in more detail below, the first chip will process the first pixel, while the second chip processes the second pixel, etc. In a preferred embodiment a pipeline of 16 chips is employed with each chip processing every 16th pixel.

The Lighting Model Employed

Figure 2:
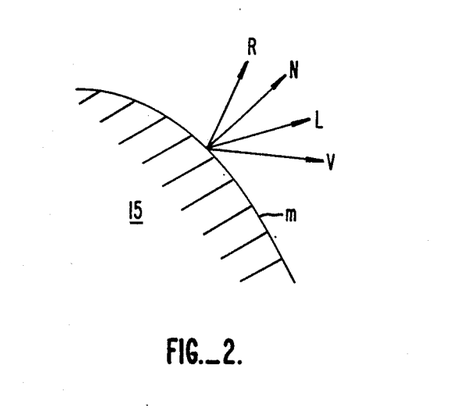
FIG. 2 illustrates the geometry of the lighting model employed.

The lighting model employed in the NVS system is efficiently implemented in hardware, in contrast to prior art software-based models. FIG. 2 displays the geometry of the lighting model. N is the vector normal to the surface of a displayed object 15, V is the viewpoint normal vector, L is the light source vector, and R is the reflectance of the viewpoint vector through the surface normal vector. In the lighting model all of the vectors are expressed in coordinates referenced to a fixed universal coordinate system, herein termed "world coordinates," as opposed to coordinates referenced to the portion of the object being displayed. The viewpoint vector is not constant across the entire screen, but is interpolated to point at each pixel in turn. Additionally, in the case of multiple light sources, there will be a different vector L for each light source.

In the lighting model, the ambient illumination due to light source l on a patch of material m is:

$$\text{ambient} = MC[m] * LA[l] * LC[l] \quad (1)$$

where:
  MC[m] is from a writable table of 128 different material colors broken up into RGB components: MC[m]·r, MC[m]·g, and MC[m]·b;
  LA[l] is from a writable table which allows specification of the amount that a particular light source adds to the ambient illumination; and
  LC[l] is from a writable table of 5 light colors divided into components LC[l]·r, LC[l]·g, and LC[l]·b.

The diffuse illumination due to light source l on a patch of material m is:

$$\text{diffuse} = (LN[l]\cdot N) * MC[m] * LC[l] \quad (2)$$

where:
  LN[l] is from a writable table of 5 light source normal vectors divided into components LN[l]·X, LN[l]·Y, and LN[l]·Z.

To compute the effects of specularity R, the reflectance of the viewpoint vector V is first derived:

$$R = 2 * (N\cdot V) * N - V \quad (3)$$

Thus, the specular component is:

$$\text{specular} = POW[R\cdot LN[l]][SP[m]]W[N\cdot LN[l]][SF[m]] * SI[m] * LC[l] \quad (4)$$

where:
  POW[s][n] is from a table of precomputed specularity power functions. The second index selects 1 of 12 predetermined powers to which to raise the 8-bit input. The powers chosen will be in the range of 1 to 60;
  W[i][n] is one of four preprogrammed specular reflection functions available for different material types. These allow the angle between the normal and the light source to affect the intensity of the specular component;
  SP[m] is from writable table of 128 different 4-bit specular powers indices for materials;
  SF[m] is from writable table of 128 different 2-bit specular reflection function indices for materials; and
  SI[m] is from writable table of 128 different 5-bit specular intensity fractional multipliers for materials. The final RGB value for the shading prior to the Z-fade stage is given by one of the four equations below, depending upon the condition described:

If N·LN[l] is negative, then only the ambient component is in use, and the RGB value is:

$$RGB = MC[m] * LA[l] * LC[l] \quad (5)$$

If N·LN[l] is positive, then all three components are summed:

$$RGB = ((LN[l]\cdot N + LA[l]) * MC[m] + \quad (6)$$
$$POW[R\cdot LN[l]][SP[m]] * W[n\cdot LN[l]][SF[m]] * SI[m]) * LC[l]$$

If the material index m=0, then no lighting computation (other than Z-fade) is to be performed, and the RGB value is taken from the incoming N value:

$$RGB = N \quad (7)$$

If this pixel is a background pixel, it does not belong to any triangle, and the command supplied with the normal vector will cause the RGB value to default to one of the two background colors, dependent upon the sign of z component of V Vy. A positive Vy indicates a "sky" pixel, a negative Vy indicates a "ground" pixel:

$$RGB = BC[\text{sign of } Vy] \quad (8)$$

where:
  BC is one of two default background colors, with RGB components: BC[i]·r, BC[i]·g, and BC[i]·b.

The effects of all the light sources can be modeled by summing together the appropriate one of the above equations over l, but excluding the contribution of any light source for which LE[m] is 0. LE[m] is taken from a writable table of 128 different 5-bit light source enable bits, 1 bit for each light source, indexed by material. As a depth cue, the background color can be bled into object pixels as a function of Z as follows. First the percentage fade r is calculated: If Z is in front of Pf:

$$r = Sf \quad (9)$$

If Z is in behind Pb:

$$r = Sb \quad (10)$$

If Z is between Pf and Pb:

$$r = Sb + (Z - Pb) * MB \quad (11)$$

The final output value is $$RGB = r * RGB + (1 - r) * BC[0] \quad (12)$$

Setting Pf, Pb, Sf, and Sb to 1 defeats fading. Other settings will give Z-based fade to black or other colors.

Normal Vector Shader

In the preferred embodiment, the normal vector shader is embodied on a single integrated circuit. A plurality of serially connected chips are employed in the system with lighting model parameters being loaded into the pipeline. Then rasterized streams of surface normal pixels are subjected to the illumination model producing a stream of 24-bit RGB image pixels as an output. Each normal vector shader chip in the pipeline contains all the circuitry necessary to perform effectively a complete shading calculation every 16 clock cyles. By placing 16 chips in series, a pipeline is formed which is capable of applying the lighting model continuously at 20 megaHertz. The resulting 16-chip subsystem forms a complete 5-light source Phong shading on each individual pixel of the scene at 20-megapixel-per-second data rates. This provides a substantial speed advantage over all previously existing implementations of sophisticated lighting models.

Each normal vector shader chip responds to RAZ and RAZD commands which are produced by the triangle processor chips (see. Ser. No. 117,110, cited above.) The RAZ command indicates that a pixel has passed through the triangle processor pipeline without being obscured by any active triangles and that a background shading calculation should be performed to generate an RGB-Z value. The RAZD command indicates that a real normal vector is present and that pixel is to be shaded using the lighting model.

The series of normal vector shader chips are designed to abut each other, and accordingly the input and output pins are provided in complementary pairs, and the pin-outs match those of the triangle processor. The functional input/output diagram for an individual chip is shown in FIG. 1. In the rasterization mode, the chip accepts data representing the surface normal vectors NX, NY, and NZ with associated Z depth and material index. The chip sends out data representing illuminated surface RGB colors with associated Z depth and material index. Each chip includes an input buffer 20 and an output buffer 24 to interface that chip with other chips in the pipeline of an overall graphics processing system. To reduce pin count the input signals to the chip are multiplexed by double clocking.

NVS Registers

Figure 3:
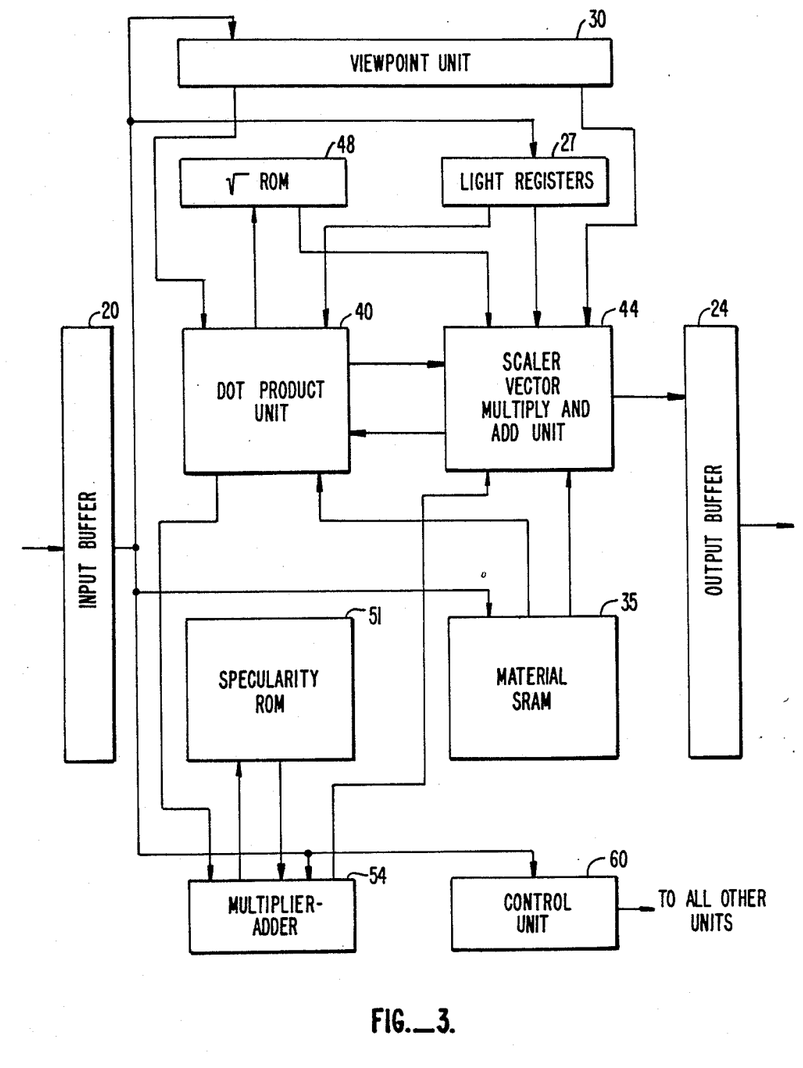
FIG. 3 is a more detailed block diagram of the normal vector shading system.

FIG. 3 is a more detailed diagram of a normal vector shader chip. The normal vector shader chip includes a number of banks of externally-loadable registers for storing three major types of information—light sources, a viewpoint vector, surface material properties—as well as additional registers for storing miscellaneous values. Table I below is a list of the registers.

TABLE I

NVS REGISTER MAP

| | Register Name | Bits | Bits/ Component | Type |
|---|---|---|---|---|
| Material Register: | mat | 42 | varies | array of 128 colors & props |
| Light Source Registers: | light normal | 27 | 9 | array of 5 vectors |
| | light color | 24 | 8 | array of 5 RGB colors |
| | light ambient | 8 | 8 | array of 5 scaler ambient coefficients |
| Viewpoint Registers: | left v | 72 | 24 | single vector |
| | xinc v | 72 | 24 | single vector |
| | yinc v | 72 | 24 | single vector |
| Misc. Registers: | config. | 16 | 16 | control |
| | sky color | 24 | 8 | single color |
| | ground color | 24 | 8 | single color |

The names of the registers are set forth in Table I together with the number of bits which specifies the physical size of the register. The column labeled "Number of Bits/Component" specifies for each vector type the size of each component. The type column identifies whether the register itself comprises an array of registers. All of the registers are implemented using static memory to eliminate the need for refreshing their contents.

Two's complement arithmetic is used throughout the chip, with most vectors being represented with 9-bit signed components, and colors represented as 8-bit vector components. For the colors, 0 represents black and 255 represents completely bright.

In the preferred embodiment, the normal vector shader chip supports five light sources of any color, with fewer than five light sources obtainable by setting the color of undesired lights to black. Of course, more or fewer light sources can be employed. For each light source four parameters are specified. The first parameter is a normal vector pointing in the direction of the light source. The second parameter is the RGB color of the light source normalized as necessary depending upon the number of light sources for the scene. The third parameter is the ambient component of the light source, which is the fraction that an individual light source adds of its color to the illumination of portions of objects which are not visible to that light source. The fourth parameter is the diffuse component of that light source, and to allow for spot lighting this component may be disabled by the user. Because the normal vectors are specified in world coordinates, the light sources need not be specified every time the viewpoint changes and thus are set until the light sources are changed.

Light Source Registers

The light normal register consists of five 27-bit registers representing a normal vector pointing in the direction of the infinite light source. Nine bits of each 27-bit register are used for the value of the X coordinate, 9 bits for the Y coordinate, and 9 bits for the Z coordinate.

The five light color registers represent the RGB color of the illumination source. Each register includes three 8-bit fields, each field representing an unsigned number between 0 and 255, with 0 representing zero intensity on that color channel and 255 representing full intensity.

The five light ambient registers, each of 8 bits, represent the percentage of the light source color to illuminate portions of surfaces which are back facing with respect to the light source vector and thus do not receive direct illumination. By providing each light source with its own ambient coefficient, allowance is provided for the selective sensitivity of the materials to differing light sources. A zero in the register corresponds to 0% sensitivity, while 255 in the register corresponds to 100% sensitivity.

Viewpoint Registers

Table I also lists three of the viewpoint registers of viewpoint unit 30. Unlike many other lighting models, the lighting model employed in the normal vector shader system does not assume that the viewpoint vector from the eye position to the surface of objects is constant. Instead, the viewpoint vector is tracked across the entire image with a separate viewpoint vector computed for each pixel in the image. This incremental computation is set up as a linear interpolation of an unnormalized vector across the face of a rectangle inscribed within a unit sphere. The head of the unnormalized viewpoint vector touches points on the rectangle corresponding to pixels on the screen. Before each vector is used in the lighting model, it is normalized to correct the vector to be a unit vector. The lighting model assumes all vectors are unit vectors. Once normalized the vector is stored within the viewpoint register 30 shown in FIG. 3. The viewpoint unit contains nine viewpoint registers as well as all circuitry necessary to interpolate the viewpoint vector across the image.

Because the viewpoint vector is interpolated across the entire image, it is represented to a high accuracy by employing 24 bits for each of the X, Y, and Z coordinate components. Because of the number of bits employed, each vector component is loaded as a separate word, and thus, the three viewpoint vector registers require 9 cycles to load.

Because the viewpoint vector field is dependent upon the viewpoint, all registers are recomputed and reloaded for each frame of the image to be processed. The interpolation components of viewpoint vector interpolator are determined by the field of view of the image, the aspect ratio of the image, the aspect ratio of the pixels, the number of pixels in each of X and Y directions, and the direction of view.

The left v register itself includes three 24-bit registers, one for each of the X, Y, and Z directions. The three registers together initially represent a vector pointing from the eye position to one of the first 16 pixels (assuming a pipeline of 16 NVS chips is employed) on the uppermost scan line of the screen. The left v vector has a different initial value in each of the 16 chips in the pipeline. As the image is processed, the left v vector is used as the starting value for the span v vector for its interpolation across the scan line. At the end of each line of the image, the left v vector register is incremented by the value of the yinc v vector register, causing the left v vector register to now point to the lefthand pixel on next scan line down from where it was before. The numeric range of the left v register is interpreted as a fraction between −1 and +1.

The xinc v register also comprises three 24-bit registers, one for each of the X, Y, and Z components of the xinc v vector. These three registers together represent the vector necessary to increment the viewpoint vector from pointing at one pixel on the screen to pointing to the 16th pixel (assuming a pipeline of 16 NVS chips) to the right on the same scan line. The xinc v vector register is repeated added to the span x vector register when processing an image, thereby interpolating the span x from its initial value of left x to finally point to the last pixel on the right of the scan line.

The yinc v register also comprises three 24-bit registers and represents the vector necessary to increment the left v viewpoint vector from pointing at a pixel on the left-hand edge on the screen to pointing at the appropriate one of the first 16 pixels on the next scan line down.

Material Registers

Each 42-bit material register within SRAM 35 contains custom properties for that material. By employing 127 different material registers, the system provides for up to 127 different materials to be represented in a single image frame. For each material, 24 bits of RGB color are provided by three 8-bit fields. This is the color value employed in the lighting model when pixels of this material are shaded. Each material register also includes 4 bits for selecting 1 of 12 different specularity powers. This value determines the amount of specular illumination present at a particular pixel, and generally corresponds to the shininess of the material.

The material registers also include 5 bits of specularity intensity control. In addition to the power of specularity, this value is a fractional multiplier of the degree of specular contribution to pixel intensity. The material register also includes 2 bits for selecting 1 of 4 different incident angle dependent surface reflection coefficient tables. This is a further down multiplier of the amount of specular contribution of the output intensity. This value is based upon the angle between the normal to the surface and normal to a particular light source. Five bits of the material register enable the material to be sensitive to any combination of the five light sources. Two bits of each material register are employed by other circuitry outside of the normal vector shading system.

Each of the sky and ground color registers includes three 8-bit fields to provide RGB information on the sky color and ground color used as background for the display image. Any pixel not otherwise employed in the displayed image will default to one of these two colors. The sky color is also the color toward which the depth cueing fades pixels which are to appear more distant from the viewer. The lighting model chooses between the sky color and ground color for unclaimed pixels by inspecting the sign of the viewpoint vector y component value. Positive values indicate that the vector from the eye position through that pixel is pointed toward the sky, rather than the ground. Negative values indicate the reverse. The ground plane effect may be disabled by setting both the sky color and the ground color to the same value. Alternatively, all background color may be disabled by setting the registers to the black level values.

The configuration register is employed when a pipeline of normal vector shader chips are used. The configuration register configures a particular chip to a specified position within the pipeline as indicated by the data in the field. One bit of the configuration register is used as an enable bit to enable the chip to process any commands received by it. This bit allows one or more chips to be mapped out of the pipeline for testing or redundancy purposes.

Commands

The overall functionality of the normal vector shader system is controlled by commands passed to it by the system control, which control is described in U.S. patent application Ser. No. 117,110, referred to above. As shown by FIG. 1, the commands are supplied to each normal vector shader chip and passed through that chip unaffected for propagation to downstream shading chips or other system features. Table II below shows the commands interpretable by the normal vector shader chip.

TABLE II

| NORMAL VECTOR SHADER COMMANDS | | |
| --- | --- | --- |
| Command | Binary | Semantics |
| RESET | 0111 | Reset NVS |
| ENABLE | 0110 | Enable NVS |
| IDLE | 0000 | Idle cycle |
| NEW | 0001 | New triangle data |
| SOL | 0100 | Header for new line |
| EOL | 0101 | End of line |
| RAZ | 0011 | Rasterize |
| RAZD | 0010 | Rasterize + Data |
| RGB | 1000 | RGB output pixel |
| NVS LD | 1001 | NVS reg load |
| EX MAT | 1010 | External material |
| GRABBED | 1011 | Taken pixel |
| EXT | 11xx | External command |

As explained in the above U.S. patent application, 56 bits of each incoming word are employed for data, with the 4-bit command from Table II appended as the four least significant bits. The RESET command causes all chips which receive it to immediately transition to a free internal state, ignoring all calculations in process. All user loadable data registers are not affected by this command.

The ENABLE command sets the enable bits on all chips to which it is addressed. The IDLE command is effectively a no operation command. It is employed by other parts of the system to insert delays between commands or data if extra time is needed. Any data present on receipt of an IDLE command is passed through without alteration.

The NEW command is employed by the triangle processor described in the above-referenced application, and has no effect on the shading chip. The SOL command precedes rasterization of a scan line and is ignored by the shader chip. The RAZ command, discussed briefly above, indicates that a pixel has been completely processed by the triangle processor without being obscured by any active pixel, and thus the shading calculation for the background color is performed to generate an appropriate RGB-Z value.

The RAZD command when received by the normal vector shader chip, indicates that a real normal vector is present and a pixel is to be shaded using the lighting model.

The EOL command indicates that rasterization has been completed for a given scan line. This command is employed by the chip to initiate the Y increment of the viewpoint vector interpolation.

The RGB command tags a word as containing a completed RGB output pixel. Accordingly, the data associated with a field appended to an RGB tag is interpreted as having been processed by the NVS chip. As shown by FIG. 1, this RGB data replaces the normal vector data originally supplied.

The NVS-LD command provides a means for loading all user programmable registers of the chip. Of the 60-bit word, the first 4 bits are the command, and the next 10 bits are the register address. The remaining bits are the data to be loaded into the register. The particular use of this command is discussed further below.

The EX MAT command provides a mechanism for extending the limited material color RAM 35 on the shader chip. In systems which supports texture mapping, all RAZD pixels are directly followed by an EX MAT command having a data value to be used in place of the value stored in the material look-up table. This mechanism allows appending full 24-bit RGB color values to each RAZD command, thereby allowing the material color across the surface of a displayed triangle to be specified on a pixel-by-pixel basis. In addition to the material color, the EX MAT command may also provide data about the specular power coefficient or other material characteristics.

The GRABBED command is employed when a chip diverts an input pixel to its internal shading process. When this occurs the chip substitutes a GRABBED command in place of the pixel, and this command passes down the pipeline to the remaining chips. Whenever a subsequent chip receives a GRABBED command, it knows that a chip further up the pipeline has taken a pixel for processing. This allows each chip to determine when it is appropriate for that chip to accept another pixel for processing by counting the number of commands which pass in the interim. If that chip has completed its computation, it will substitute its output for the GRABBED command.

Command Sequencing

During rasterization the shader chip accepts the output from the triangle processor chip, applies its lighting model, and generates a stream of RGB pixel values as output. When a sequence of shader chips is employed in a pipeline, the chips function as follows. The input signal to the pipeline is a stream of RAZ or RAZD pixels supplied by the triangle processors, with no gaps or other pixel types intermingled. Initially the pipeline is empty, and upon receipt of the first pixel, the first shader chip will accept the data and supply a GRABBED command in place of the command received. The chip then begins performing a shading computation on the data received. Each pixel requires 64 cycles to complete, however, after the chip can begin processing another pixel. Thus, when the next pixel arrives, the first chip will still be processing the first pixel, and accordingly the first chip will pass that second pixel unaltered to the second NVS chip. The second chip accepts that data, substitutes a GRABBED command, and begins processing.

After 16 such cycles, all 16 chips will have started processing pixels. Upon receipt of the 17th pixel, the first chip will have another window opened for beginning a shading calculation, and will again pass on a GRABBED command. Only after 64 pixels have entered the pipeline will the first chip complete transforming the first pixel's normal vector information into the first RGB pixel. When the first chip accepts the 65th pixel, rather than supplying a GRABBED command, it will send out an RGB command with the completed RGB data. This is passed through, without modification, all of the downstream NVS chips to emerge as the first output RGB value. The second chip acts in the same manner with respect to the 66th pixel, supplying as output the second RGB pixel. This process continues, resulting in a continuous stream of RGB data at the output pin of the 16th chip.

Chip Architecture

FIG. 3 is a block diagram of the shader chip showing major functional units. The functions of the input and output buffer 20 and 24, the viewpoint unit 30, and the light registers 27, already have been discussed above in conjunction with the registers they contain. Each NVS chip also includes a dot product unit 40 which accepts as input two 27-bit vectors and produces a single 9-bit signed result. A scaler-vector unit 44 accepts as input three 27-bit vectors, and in response multiplies the components of the first vector by the second, adds the components of the third vector, and produces a 27-bit vector result. For example, if the three vectors are a, b, and c, and each has x, y and z components, the output vector of unit 44 will have an x component $ax \cdot bx + cx$. The y and z components of the output vector are calculated similarly. A square root ROM 48 contains an inverse square root look-up table of $256 \times 8$. The square root ROM accepts as input a result from the dot product unit, and supplies as output the reciprocal of the square root of the input value. The output signal from the square root ROM is always supplied to the scaler vector unit 44 to normalize the vector. The specularity ROM 51 is $4096 \times 8$ and contains sixteen $256 \times 8$ look-up tables. Twelve of these tables contain power functions for different degrees of specularity, while the remaining four contain preprogrammed specular reflection functions for different types of material.

The specularity ROM 51 contains both the specular reflection function data and specularity power function data. Both data tables have similar access patterns. The 256x8 bank is selected by the material RAM output register bits while the word within the bank is selected by the output from the dot product unit 40. The material SRAM 35 contains a $128 \times 42$ bit material property look-up table. Addressed by material index, each 42-bit word contains RGB colors of materials, the degree of specularity, and all the other material properties described in the lighting model. Multiplier-adder 54 is a $9 \times 9$ signed two's complement multiplier and adder. It accepts as input signals three 9-bit scalers, and in response, generates a 9-bit scaler result. Finally, control unit 60 contains the microcode sequencer for the operation of the overall chip and is coupled to all of the other units.

Loading the Chip

The shading chip is loaded within initial data using the NVS LD command. The load command consists of a 60-bit word with the four least significant bits being the command, and the next ten least significant bits being the register bits. The remaining 46 bits are used for data to be loaded into the addressed internal register. Of course, for most registers not all of the 46 bits are employed. Because the commands are essentially independent, the data may be loaded into the chip in any order as long as the pipeline is empty of pixel data. Thus, for example, the material SRAM 35 may be loaded in one block of 127 load commands, or individual entries modified one at a time. Because each NVS chip passes load commands on to the next chip in the pipeline without alteration, all load commands are executed by all of the chips in the pipeline.

The one instance in which the load commands may not be entered in any order relates to the viewpoint unit 30. To place a different value for this register in each of the 16 chips in a typical pipeline, a special load sequence is required. This sequence consists of 16 load commands in a row, with each command specifying a left v vector register in the address field. In addition, each load command contains a special 4-bit idle count field loaded with 15 in the first load command, 14 in the next, etc. In this manner the first chip in the pipeline will execute the first of the 16 load commands and ignore the next 15. The second chip in the pipeline will never receive the first load command, instead receiving an IDLE command. It thus will execute the second load command and ignore the next 14.

Chip Operation

The shader chip as exemplified by the block diagram of FIG. 3 receives as input signals from the triangle processor chips the material index, the Z depth, and data representing the surface normal vector. All of the other necessary parameters are assumed to have been preloaded into the chip.

The chip begins by computing light source independent information. First, the internally interpolated viewpoint vector from viewpoint unit 30 is normalized and restored in unit 30. This operation is performed by the dot product unit 40 in conjunction with the square root ROM 48 and the scaler-vector 44. Expressed in pseudo-code:

$temp = V' <dot> V'$ $temp = SQROM(temp)$ $V = temp <sv+> V' + 0$

Next, the surface normal vector is normalized, again using the dot product unit 40 and the square root ROM 48:

$temp = N' <dot> N'$ $temp = SQROM(temp)$ $N = temp <sv+> N, +0$

After this is completed, the reflectance vector R is computed using the dot product unit 40 and scaler vector multiply and add unit 44.

$\cos nv = N <dot> V$ $R = (2 * \cos nv) <sv+> N - V$

After completing this portion of the light source independent information, light source dependent calculations are performed. First, the vector products of the light source, the normalized surface normal vector, and the normalized reflectance vector are computed, again employing the dot product unit 40.

$\cos\_nl = LN[l] <dot> N$ $\cos\_rl = LN[l] <dot> R$

Then, the specular component is computed using the vector product computed above as an index into the specularity ROM 51. The results are multiplied together using multiplier 54 to provide a measure of the intensity per unit area of the surface being shaded.

$temp = PWROM[SF[m]][\cos\_nl]$ $temp2 = PWROM[SP[m]][\cos\_rl]$ $temp = temp <*> temp2$ $spec = temp <*> SI[m]$ The ambient component, resulting from surrounding surfaces, is then added to the diffuse component, $da = \cos\_nl + LA[l]$ Then, the final RGB value may be computed by multiplying in the color of the material, its specular component, and multiplying by the light color:

$temp = CM[m] <sv+> da + spec$ $oRGB = CL[l] <sv+> temp + oRGB$ where oRGB is the summation input for the RGB value computed for the previous light source, or 0 if this is the first light source. At this stage, the light source dependent portion of the computation has been completed.

Next, the effect of depth cueing is calculated. First the percentage fade to allow for Z depth is computed. For the most complex case in which Z is between the front and back (Pf) fade planes, i.e., Pf<Z<Pb:

$temp = Z - Pf$ $temp = temp <*> Mb$ $temp = temp + Sf$

Mb is the slope of the fade relationship between the planes. Then, the background contribution bRGB is computed using:

$temp2 = 1 - temp$ $bRGB = BC[0] < sv+> temp2 + 0$

Finally, the RGB value from the rest of the shading model is merged with the above result to produce the final RGB output value fRGB:

$fRGB = oRGB <sv+> temp + bRGB$

The light source dependent information is calculated once for each of the five different light sources, then summed to provide the final color value for that pixel. Any RGB overflows (over 255) are truncated to 255.

The foregoing has been a description of the preferred embodiment in which specific details regarding its implementation have been provided. These were provided to enable a complete understanding of the invention and should not be construed as limiting the invention. The scope of the invention may be ascertained from the appended claims.

I claim:

1. A normal vector shading processor for use in a serial pipeline of identical processors for shading pixels of a three-dimensional image to be displayed, comprising:
    a processor input;
    a memory for storing set-up data indicating at least a direction and intensity of at least one light source and a viewpoint of a viewer of said three-dimensional image;
    means coupled to said memory, for performing mathematical operations on a representation of a pixel provided to said processor input in accordance with said set-up in said memory, said mathematical operations including at least a vector dot product, a scaler product and a scaler sum; and
    command interpretation means, coupled to said processor input and having control inputs coupled to said memory and said means for performing mathematical operations, for
        detecting a load command in a predetermined command field of input data on said processor input and providing first control signals to said memory to load said set-up data in a predetermined data field of said input data into said memory,
        detecting a process command in said command field and providing second control signals to said means for performing mathematical operations, and
        detecting a grabbed command in said command field and providing third control signals to cause said input data to be presented to an output of said processor without being altered.

2. The processor of claim 1 wherein said means for performing mathematical operations comprises:
    dot product means for comprising the dot products of two vectors;
    vector product means coupled to the dot product means for computing the product of two vectors and adding a third vector;
    multiplier-adder means connected to each of the dot product means and the vector product means for computing products and sums of scaler values; and
    square root storage means connected to the dot product means and the vector product means for storing a table of inverse square roots of values;
    wherein the memory is connected to each of the dot product means, vector product means and multiplier-adder means.

3. The processor of claim 1 further comprising a plurality of identical processors coupled in series.

4. The processor of claim 1 wherein said command interpretation means detects a first code in a second predetermined field of said input data and designates a pixel corresponding to said first code as a background pixel.

5. The processor of claim 1 wherein said input data includes a field representing a normalization vector for a pixel represented by said input data, said command interpretation means substituting a color or shading value calculated by said means for performing mathematical operations for said normalization vector to produce a modified input data, and providing said modified input data to said processor output.

6. A normal vector shading system comprising:
    a serial pipeline of a plurality of identical processors for shading pixels of a three-dimensional image to be displayed, each processor including
    a processor input;
    a plurality of light source registers for storing at least a direction and intensity of at least one light source;
    at least one viewpoint register for storing a viewpoint of a viewer of said three-dimensional image;
    a plurality of material registers for storing information regarding the external appearance of an object in said image;
    dot product means for comprising the dot product of two vectors;
    vector product means coupled to the dot product means for computing the product of two vectors and adding a third vector;
    multiplier-adder means connected to each of the dot product means and the vector product means for computing products and sums of scaler values;
    square root storage means connected to the dot products means and the vector product means for storing a table of inverse square root of values;
    wherein the registers are connected to each of the dot product means, vector product means and multiplier-adder means; and
    control means for
        providing command signals to said dot product means, vector product means, multiplier-adder means and square root storage means to perform operations on a normalization vector in a pixel representation provided to said processor input,
        detecting a load command in a predetermined command field of input data on said processor input and providing first control signals to said memory to load set-up data in a predetermined data field of said input data into said registers,
        detecting a process command in said command field and generating said command signals,
        detecting a grabbed command in said command field and providing second control signals to cause said input data to be presented to an output of said processor without being altered, and
        substituting a color or a shading value calculated by said processor for said normalizations vector to produce a modified input data, and providing said modified input data to said processor output.

* * * * *